(No Model.) 2 Sheets—Sheet 1.

C. H. STRATTON.
VEHICLE.

No. 517,988. Patented Apr. 10, 1894.

WITNESSES
Emil Neuhart.
Chas. F. Burkhardt.

Chas. H. Stratton INVENTOR.
By Wilhelm Bonner
ATTORNEYS.

(No Model.) 2 Sheets—Sheet 2.

C. H. STRATTON.
VEHICLE.

No. 517,988. Patented Apr. 10, 1894.

WITNESSES:
Emil Neuhart
Chas. F. Burkhardt

Chas. H. Stratton INVENTOR.
By Wilhelm Braunert
ATTORNEYS.

UNITED STATES PATENT OFFICE.

CHARLES H. STRATTON, OF BUFFALO, NEW YORK.

VEHICLE.

SPECIFICATION forming part of Letters Patent No. 517,988, dated April 10, 1894.

Application filed November 11, 1893. Serial No. 490,664. (No model.)

*To all whom it may concern:*

Be it known that I, CHARLES H. STRATTON, a citizen of the United States, residing at the city of Buffalo, in the county of Erie and State of New York, have invented a new and useful Improvement in Vehicles, of which the following is a specification.

This invention relates more especially to vehicles which are provided with side recesses or passages for entering the vehicle. Heretofore these passages have usually been closed by hinged doors which swing outward in opening, but this construction is undesirable, because such doors become loose and rattle and are liable to swing against the wheels of the vehicle and become marred. Such side passages have also been formed by tilting the front seat forwardly.

The object of my invention is to provide the vehicle with side doors or panels, which overcome the above objections and which obviate the necessity of displacing the front seat in entering the vehicle.

Figure 1:
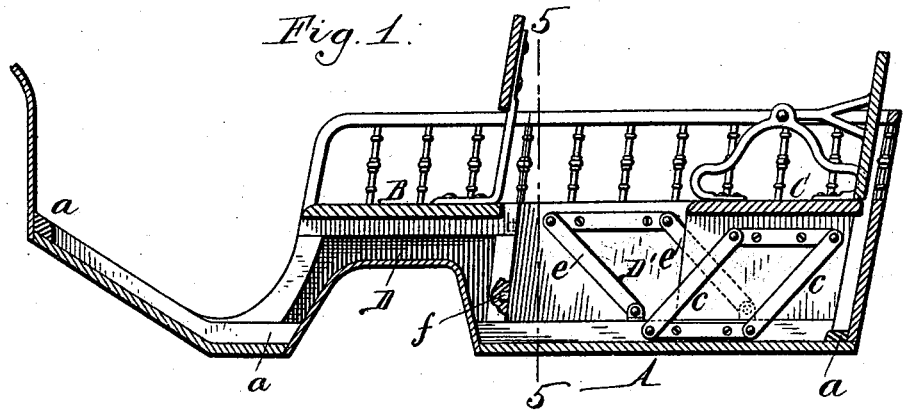
Figure 2:
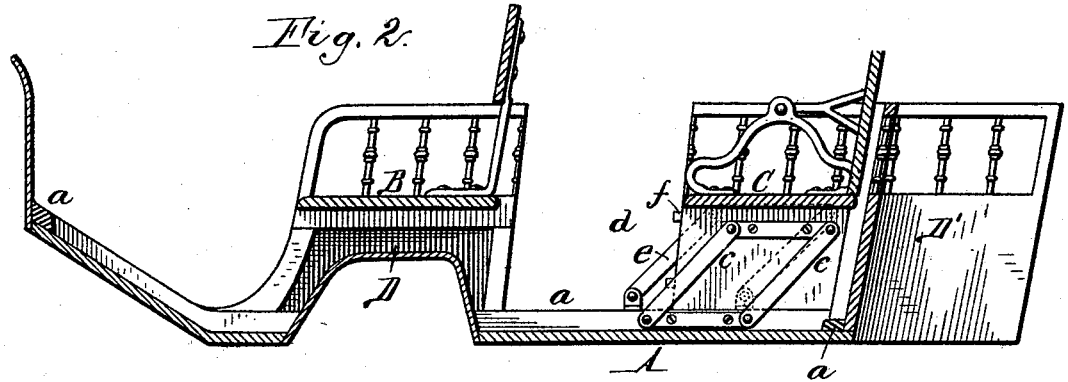
Figure 3:
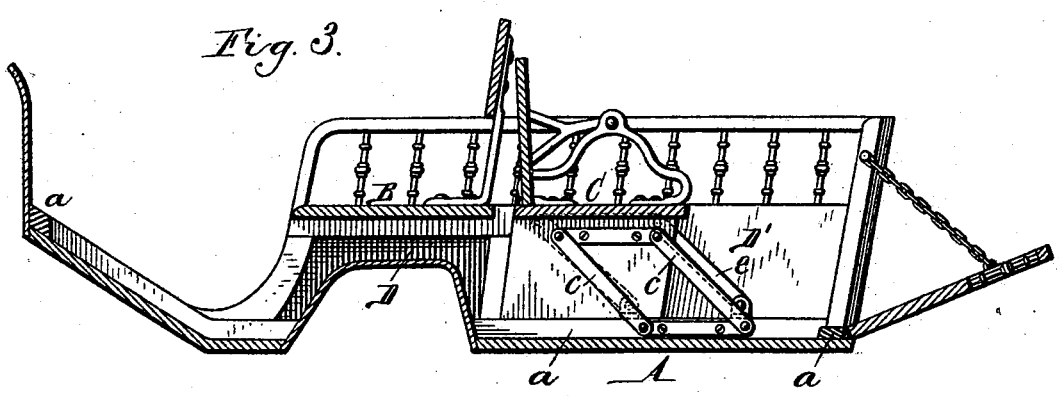
Figure 4:
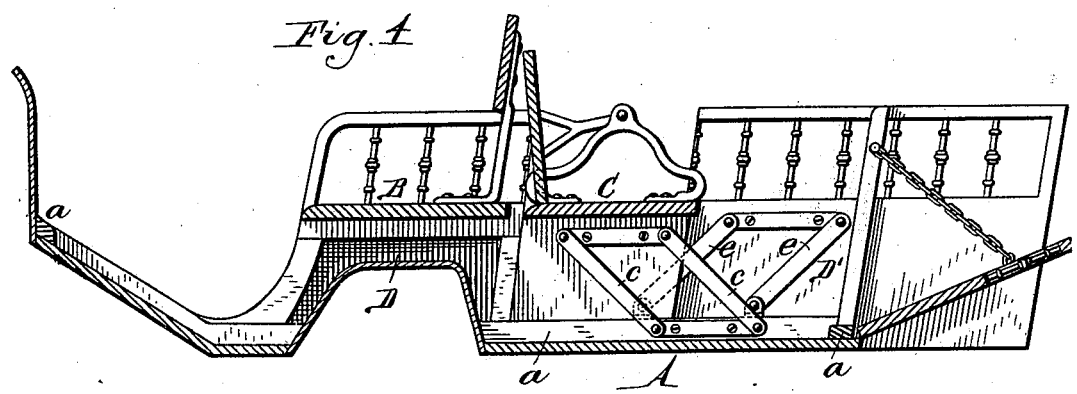
Figure 5:
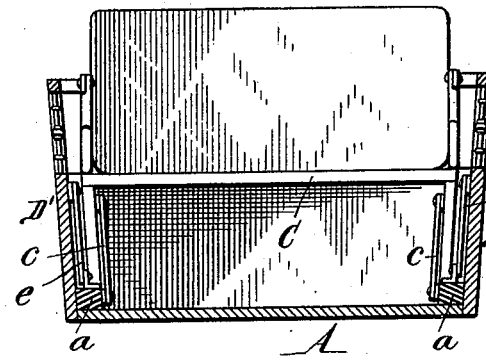
Figure 6:
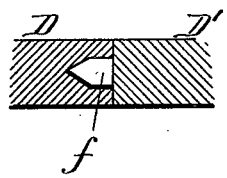
Figure 7:
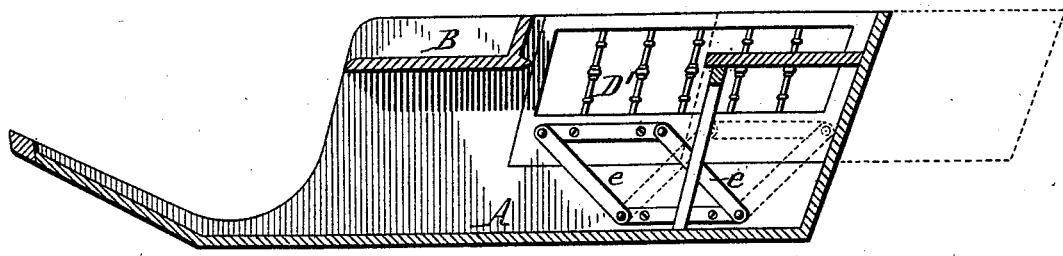

In the accompanying drawings consisting of two sheets:—Figure 1 is a vertical longitudinal section of a shifting seat vehicle containing my improvement, showing the side recesses or passages closed and both seats facing forward. Fig. 2 is a similar view, showing the side passages open. Fig. 3 is a view similar to Fig. 1, showing the seats arranged dos-a-dos. Fig. 4 is a similar section showing the seats in the same position and the side doors or panels moved backward to form guards on opposite sides of the end gate. Fig. 5 is a cross section of the vehicle in line 5—5, Fig. 1. Fig. 6 is a horizontal section, on an enlarged scale, of the joint between the body and one of the rearwardly moving panels. Fig. 7 is a vertical longitudinal section of a vehicle, showing a modified construction of the invention.

Like letters of reference refer to like parts in the several figures.

A represents the bottom of the vehicle body having the usual sills *a*.

B is a front seat which may be either stationary or movable and C the rear seat which may be stationary, but is preferably connected with the bottom sills by parallel jump irons *c* in a well known manner, so as to be capable of occupying the rearward position shown in Figs. 1 and 2, or the forward dos-a-dos position shown in Figs. 3 and 4. Those portions or panels D of the sides of the vehicle body, upon which the front seat is supported, are preferably stationary, while the panels or portions D' of the sides which extend from the rear edges of these stationary panels to the rear end of the body are made movable lengthwise of the body, so that they may be shifted backward to the position shown in Fig. 2, to form side recesses or passages *d* between the front and rear seats for reaching the rear seat, or be shifted forward to close the spaces between the seats, as shown in Fig. 1. These movable side panels are preferably made of such a length that when their front ends rest against the rear edges of the stationary panels D, their rear ends are flush with the rear end of the vehicle body, thus presenting the appearance of a body having continuous closed sides. The movable side panels are preferably connected with the bottom sills *a* by parallel links or jump irons *e* which are pivoted at their upper ends to the inner sides of the movable panels and at their lower ends to the bottom sills. These links or jump irons guide the movable panels in shifting the same, and enable them to operate with little friction, as the panels are lifted clear of the bottom and swing upon the pivots of the links, in being moved from one position to the other.

I order to form a close fit between the movable panels and the stationary side panels, the former are provided at their front ends with dowels *f* which fit into sockets formed in the adjacent edges of the stationary panels, as shown in Figs. 1 and 6. When the rear seat is shifted forward and the end gate is swung down to form a dos-a-dos vehicle, as shown in Figs. 3 and 4, the movable door panels may be shifted to their rearward position and retained in such position in which case their projecting rear portions form guards or rearward continuations of the vehicle body on opposite sides of the lowered end gate, whereby the latter is inclosed and the feet of the occupants of the rear seat are hidden from view. In this position of the movable side panels, the spaces left between the adjacent end of the stationary and movable side panels are closed by the upright or riser panels of the rear seat, as shown in Fig. 4.

If desired, the movable panel, instead of extending the full height of the sides, may form only about the upper two thirds, or less, of the same, as shown in Fig. 7, the lower portion thereof being stationary.

My improvement, while illustrated in the drawings in connection with jump seat vehicles, is obviously applicable to vehicles of other kinds in which it is desirable to provide side passages which are capable of being closed after entering the vehicle.

As the movable door panels move parallel with the sides of the vehicle body they cannot become marred by the wheels and are not liable to become loose and rattle; and, while avoiding the necessity of shifting the seats for entering the vehicle, they form part of the sides of the body and thus add an important advantage to the vehicle without materially increasing its cost.

I claim as my invention—

1. In a two-seated vehicle, the combination with a rigid vehicle body having stationary front panels and a front seat secured between the same, of longitudinally movable rear panels arranged in rear of the stationary front panels and forming rearward continuations of the same, when in their forward position, and capable of longitudinal movement on the body independent of the rear seat, whereby passage ways are opened between the front and rear seats when the movable panels are shifted backwardly, and the said passage ways are closed when the rear seat is in use, substantially as set forth.

2. A vehicle body provided with side panels capable of moving lengthwise thereon and having their rear ends arranged flush with the rear end of the vehicle body, when in their forward position, whereby the panels project beyond the rear end of the body, when shifted backward, substantially as set forth.

3. The combination with a vehicle body having longitudinally movable side panels, of links or jump irons connecting said panels with the stationary portion of the body, substantially as set forth.

4. A vehicle body having a downwardly swinging end gate, and longitudinally movable side panels adapted to be shifted backward beyond the rear end of the body, for forming guards on opposite sides of the end gate, substantially as set forth.

Witness my hand this 7th day of November, 1893.

CHARLES H. STRATTON.

Witnesses:
CARL F. GEYER,
JNO. J. BONNER.